(12) United States Patent
Tanaka et al.

(10) Patent No.: US 11,674,459 B2
(45) Date of Patent: Jun. 13, 2023

(54) CONTROL APPARATUS, VEHICLE SYSTEM, AND CONTROL METHOD

(71) Applicant: HONDA MOTOR CO., LTD., Tokyo (JP)

(72) Inventors: Masaki Tanaka, Wako (JP); Yoichi Yamashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 17/026,463

(22) Filed: Sep. 21, 2020

(65) Prior Publication Data
US 2021/0087985 A1  Mar. 25, 2021

(30) Foreign Application Priority Data

Sep. 25, 2019 (JP) .............................. JP2019-173978

(51) Int. Cl.
*F02D 29/02* (2006.01)
*G01L 5/00* (2006.01)
(Continued)

(52) U.S. Cl.
CPC ............... *F02D 29/02* (2013.01); *B60L 3/08* (2013.01); *B60L 9/18* (2013.01); *G01L 5/0042* (2013.01)

(58) Field of Classification Search
CPC ............... B60L 15/08; B60L 2210/42; B60L 2240/421; B60L 2240/42
See application file for complete search history.

(56) References Cited

U.S. PATENT DOCUMENTS 8,281,886 B2 * 10/2012 Saha .................... H02P 21/0089
  318/811
8,497,646 B2 * 7/2013 Yamada .............. H02P 21/0003
  327/100
(Continued)

FOREIGN PATENT DOCUMENTS

CN 101803177 8/2010
CN 102282758 12/2011
(Continued)

OTHER PUBLICATIONS

Japanese Office Action for Japanese Patent Application No. 2019-173978 dated Jun. 29, 2021.
(Continued)

*Primary Examiner* — Carl C Staubach
(74) *Attorney, Agent, or Firm* — Amin, Turocy & Watson, LLP (57) ABSTRACT

A control apparatus includes: a data acquisition part that is configured to acquire torque data indicating a drive torque of an electric motor, rotation number data indicating a rotation number of the electric motor, and DC voltage data indicating a DC voltage supplied to an inverter which supplies an AC current to the electric motor; a determination basis derivation part that is configured to derive a determination basis based on a drive efficiency of the electric motor by using the torque data, the rotation number data, and the DC voltage data; and a control method determination part that is configured to determine, based on the determination basis, which one of a one-pulse control and a pulse-width modulation control is employed as a control method of the inverter.

9 Claims, 10 Drawing Sheets (51) Int. Cl.
  *B60L 9/18* (2006.01)
  *B60L 3/08* (2006.01)

(56) References Cited

U.S. PATENT DOCUMENTS

| | | | |
|---|---|---|---|
| 9,246,428 B2* | 1/2016 | Yokozutsumi | H02P 21/0089 |
| 9,407,181 B2* | 8/2016 | Furukawa | H02M 7/53875 |
| 10,103,675 B2* | 10/2018 | Yokozutsumi | H02P 27/08 |
| 10,351,002 B2* | 7/2019 | Saha | B60L 3/04 |
| 11,190,125 B2* | 11/2021 | Kajino | B60L 15/2045 |
| 11,325,478 B2* | 5/2022 | Tanaka | B60L 15/025 |
| 11,349,428 B2* | 5/2022 | Tanaka | B60L 15/20 |
| 2007/0229010 A1* | 10/2007 | Tsuji | H02P 21/06 |
| | | | 318/432 |
| 2010/0140003 A1* | 6/2010 | Saha | B60L 15/08 |
| | | | 318/432 |
| 2010/0301788 A1* | 12/2010 | Chen | H02P 21/0003 |
| | | | 318/400.3 |
| 2011/0043149 A1 | 2/2011 | Kitanaka | |
| 2011/0273125 A1 | 11/2011 | Yamada et al. | |
| 2013/0135906 A1 | 5/2013 | Kawamura | |
| 2013/0187583 A1* | 7/2013 | Iwatsuki | H02P 6/10 |
| | | | 318/400.17 |
| 2015/0048765 A1 | 2/2015 | Park et al. | |
| 2021/0086624 A1* | 3/2021 | Tanaka | B60L 15/08 |

FOREIGN PATENT DOCUMENTS

| | | |
|---|---|---|
| CN | 102934344 | 2/2013 |
| CN | 104378027 | 2/2015 |
| CN | 108476011 | 8/2018 |
| EP | 3432467 | 1/2019 |
| JP | 10-234199 | 9/1998 |
| JP | 2007-181400 | 7/2007 |
| JP | 2009-100548 | 5/2009 |
| JP | 2013-055713 | 3/2013 |
| JP | 2013-090551 | 5/2013 |
| WO | 2008/107992 | 9/2008 |

OTHER PUBLICATIONS

Chinese Office Action for Chinese Patent Application No. 202010089534.1 dated Mar. 4, 2023.

* cited by examiner

CONTROL APPARATUS, VEHICLE SYSTEM, AND CONTROL METHOD

CROSS-REFERENCE TO RELATED APPLICATION

Priority is claimed on Japanese Patent Application No. 2019-173978, filed on Sep. 25, 2019, the contents of which are incorporated herein by reference.

BACKGROUND

Field of the Invention

The present invention relates to a control apparatus, a vehicle system, and a control method.

Background

In the related art, vehicles using an electric motor as a power source such as, for example, an electric vehicle (EV), a hybrid vehicle (HV), and a fuel cell vehicle (FCV) have been developed.

A one-pulse control and a pulse-width modulation control have been developed as a control method of an inverter that supplies an alternating current to an electric motor mounted on the vehicle described above.

For example, an electric vehicle control apparatus according to Japanese Unexamined Patent Application, First Publication No. 2009-100548 has a means for switching a control mode from a synchronous one-pulse control mode to a multiple-pulse control mode when an inverter frequency in the synchronous one-pulse control mode is within a specific frequency band.

SUMMARY

However, although the electric vehicle control apparatus described above can reduce an inverter harmonic current in a specific signal frequency band, the electric vehicle control apparatus may not improve an electric power cost.

An object of an aspect of the present invention is to provide a control apparatus, a vehicle system, and a control method capable of improving an electric power cost.

A control apparatus according to a first aspect of the present invention is a control apparatus including: a data acquisition part that is configured to acquire torque data indicating a drive torque of an electric motor, rotation number data indicating a rotation number of the electric motor, and DC voltage data indicating a DC voltage supplied to an inverter which supplies an AC current to the electric motor; a determination basis derivation part that is configured to derive a determination basis based on a drive efficiency of the electric motor by using the torque data, the rotation number data, and the DC voltage data; and a control method determination part that is configured to determine, based on the determination basis, which one of a one-pulse control and a pulse-width modulation control is employed as a control method of the inverter.

As a second aspect of the present invention, the control apparatus according to the first aspect may further include: a first loss estimation part that is configured to estimate a first loss which is a sum of at least part of a loss caused by the inverter and at least part of a loss caused by the electric motor in a case where the one-pulse control is employed as the control method of the inverter; and a second loss estimation part that is configured to estimate a second loss which is a sum of at least part of a loss caused by the inverter and at least part of a loss caused by the electric motor in a case where the pulse-width modulation control is employed as the control method of the inverter, wherein the determination basis derivation part may derive the determination basis indicating that the one-pulse control is preferable as the control method of the inverter in a case where the first loss estimated by the first loss estimation part is smaller than the second loss estimated by the second loss estimation part.

As a third aspect of the present invention, the control apparatus according to the first aspect may further include: a first loss estimation part that is configured to estimate a first loss which is a sum of at least part of a loss caused by the inverter and at least part of a loss caused by the electric motor in a case where the one-pulse control is employed as the control method of the inverter; and a second loss estimation part that is configured to estimate a second loss which is a sum of at least part of a loss caused by the inverter and at least part of a loss caused by the electric motor in a case where the pulse-width modulation control is employed as the control method of the inverter, wherein the determination basis derivation part may derive the determination basis indicating that the pulse-width modulation control is preferable as the control method of the inverter in a case where the second loss estimated by the second loss estimation part is smaller than the first loss estimated by the first loss estimation part.

A fourth aspect of the present invention is the control apparatus according to the first aspect, wherein the determination basis derivation part may derive, as the determination basis, a one-pulse control lower limit rotation number which is a function of the DC voltage and the drive torque and which is a lower limit of the rotation number of the electric motor in a case where the one-pulse control is capable of being employed as the control method of the inverter, and the control method determination part may determine that the one-pulse control is employed as the control method of the inverter in a case where the rotation number indicated by the rotation number data is equal to or more than the one-pulse control lower limit rotation number.

A fifth aspect of the present invention is the control apparatus according to the first aspect, wherein the determination basis derivation part may derive, as the determination basis, a one-pulse control lower limit rotation number which is a function of the DC voltage and the drive torque and which is a lower limit of the rotation number of the electric motor in a case where the one-pulse control is capable of being employed as the control method of the inverter, and the control method determination part may determine that the pulse-width modulation control is employed as the control method of the inverter in a case where the rotation number indicated by the rotation number data is less than the one-pulse control lower limit rotation number.

A sixth aspect of the present invention is the control apparatus according to the first aspect, wherein the determination basis derivation part may derive, as the determination basis, a pulse-width modulation control upper limit torque and a pulse-width modulation control lower limit torque which are a function of the rotation number and the DC voltage and which are an upper limit and a lower limit of the drive torque of the electric motor, respectively, in a case where the pulse-width modulation control is capable of being employed as the control method of the inverter, and the control method determination part may determine that the one-pulse control is employed as the control method of the inverter in a case where the drive torque indicated by the torque data is less than the pulse-width modulation control lower limit torque or in a case where the drive torque indicated by the torque data exceeds the pulse-width modulation control upper limit torque.

A seventh aspect of the present invention is the control apparatus according to the first aspect, wherein the determination basis derivation part may derive, as the determination basis, a pulse-width modulation control upper limit torque and a pulse-width modulation control lower limit torque which are a function of the rotation number and the DC voltage and which are an upper limit and a lower limit of the drive torque of the electric motor, respectively, in a case where the pulse-width modulation control is capable of being employed as the control method of the inverter, and the control method determination part may determine that the pulse-width modulation control is employed as the control method of the inverter in a case where the drive torque indicated by the torque data is equal to or more than the pulse-width modulation control lower limit torque and is equal to or less than the pulse-width modulation control upper limit torque.

A vehicle system according to an eighth aspect of the present invention is a vehicle system including: a data acquisition part that is configured to acquire torque data indicating a drive torque of an electric motor which is a power source of a vehicle, rotation number data indicating a rotation number of the electric motor, and DC voltage data indicating a DC voltage supplied to an inverter which supplies an AC current to the electric motor; a determination basis derivation part that is configured to derive a determination basis based on a drive efficiency of the electric motor by using the torque data, the rotation number data, and the DC voltage data; and a control method determination part that is configured to determine, based on the determination basis, which one of a one-pulse control and a pulse-width modulation control is employed as a control method of the inverter.

A control method according to a ninth aspect of the present invention is a control method including: acquiring torque data indicating a drive torque of an electric motor, rotation number data indicating a rotation number of the electric motor, and DC voltage data indicating a DC voltage supplied to an inverter which supplies an AC current to the electric motor; deriving a determination basis based on a drive efficiency of the electric motor by using the torque data, the rotation number data, and the DC voltage data; and determining, based on the determination basis, which one of a one-pulse control and a pulse-width modulation control is employed as a control method of the inverter.

According to the first to ninth aspects described above, the control apparatus determines which one of the one-pulse control and the pulse-width modulation control is employed on the basis of the determination basis based on the drive efficiency of the electric motor, which is derived by using the torque data, the rotation number data, and the DC voltage data. Thereby, the control apparatus is able to improve an electric power cost.

According to the second aspect described above, the control apparatus derives the determination basis indicating that the one-pulse control is preferable as the control method of the inverter in a case where the first loss is smaller than the second loss. Thereby, the control apparatus is able to improve an electric power cost by confirming that the loss in a case where the one-pulse control is employed is smaller than the loss in a case where the pulse-width modulation control is employed and then employing the one-pulse control.

According to the third aspect described above, the control apparatus derives the determination basis indicating that the pulse-width modulation control is preferable as the control method of the inverter in a case where the second loss is smaller than the first loss. Thereby, the control apparatus is able to improve an electric power cost by confirming that the loss in a case where the pulse-width modulation control is employed is smaller than the loss in a case where the one-pulse control is employed and then employing the pulse-width modulation control.

According to the fourth aspect described above, the control apparatus derives the one-pulse control lower limit rotation number as the determination basis.

Then, the control apparatus determines that the one-pulse control is employed in a case where the rotation number indicated by the rotation number data is equal to or more than the one-pulse control lower limit rotation number. Thereby, the control apparatus is able to employ the one-pulse control in accordance with the drive torque of the electric motor and improve an electric power cost without performing a process of estimating the first loss in a case where the one-pulse control is employed, a process of estimating the second loss in a case where the pulse-width modulation control is employed, and a process of comparing a magnitude relationship between the first loss and the second loss.

According to the fifth aspect described above, the control apparatus derives the one-pulse control lower limit rotation number as the determination basis.

Then, the control apparatus determines that the pulse-width modulation control is employed in a case where the rotation number indicated by the rotation number data is less than the one-pulse control lower limit rotation number. Thereby, the control apparatus is able to employ the one-pulse control in accordance with the drive torque of the electric motor and improve an electric power cost without performing a process of estimating the first loss in a case where the one-pulse control is employed, a process of estimating the second loss in a case where the pulse-width modulation control is employed, and a process of comparing a magnitude relationship between the first loss and the second loss.

According to the sixth aspect described above, the control apparatus derives the pulse-width modulation control upper limit torque and the pulse-width modulation control lower limit torque as the determination basis. Then, the control apparatus determines that the one-pulse control is employed in a case where the drive torque indicated by the torque data is less than the pulse-width modulation control lower limit torque or in a case where the drive torque indicated by the torque data exceeds the pulse-width modulation control upper limit torque. Thereby, the control apparatus is able to employ the one-pulse control in accordance with the drive torque of the electric motor and improve an electric power cost without performing a process of estimating the first loss in a case where the one-pulse control is employed, a process of estimating the second loss in a case where the pulse-width modulation control is employed, and a process of comparing a magnitude relationship between the first loss and the second loss.

According to the seventh aspect described above, the control apparatus derives the pulse-width modulation control upper limit torque and the pulse-width modulation control lower limit torque as the determination basis. Then, the control apparatus determines that the pulse-width modulation control is employed in a case where the drive torque indicated by the torque data is equal to or more than the pulse-width modulation control lower limit torque and is equal to or less than the pulse-width modulation control upper limit torque. Thereby, the control apparatus is able to employ the one-pulse control in accordance with the drive torque of the electric motor and improve an electric power cost without performing a process of estimating the first loss in a case where the one-pulse control is employed, a process of estimating the second loss in a case where the pulse-width modulation control is employed, and a process of comparing a magnitude relationship between the first loss and the second loss.

DESCRIPTION OF THE EMBODIMENTS

Hereinafter, embodiments of a control apparatus, a vehicle system, and a control method according to the present invention will be described with reference to the drawings.

First Embodiment

Figure 1:
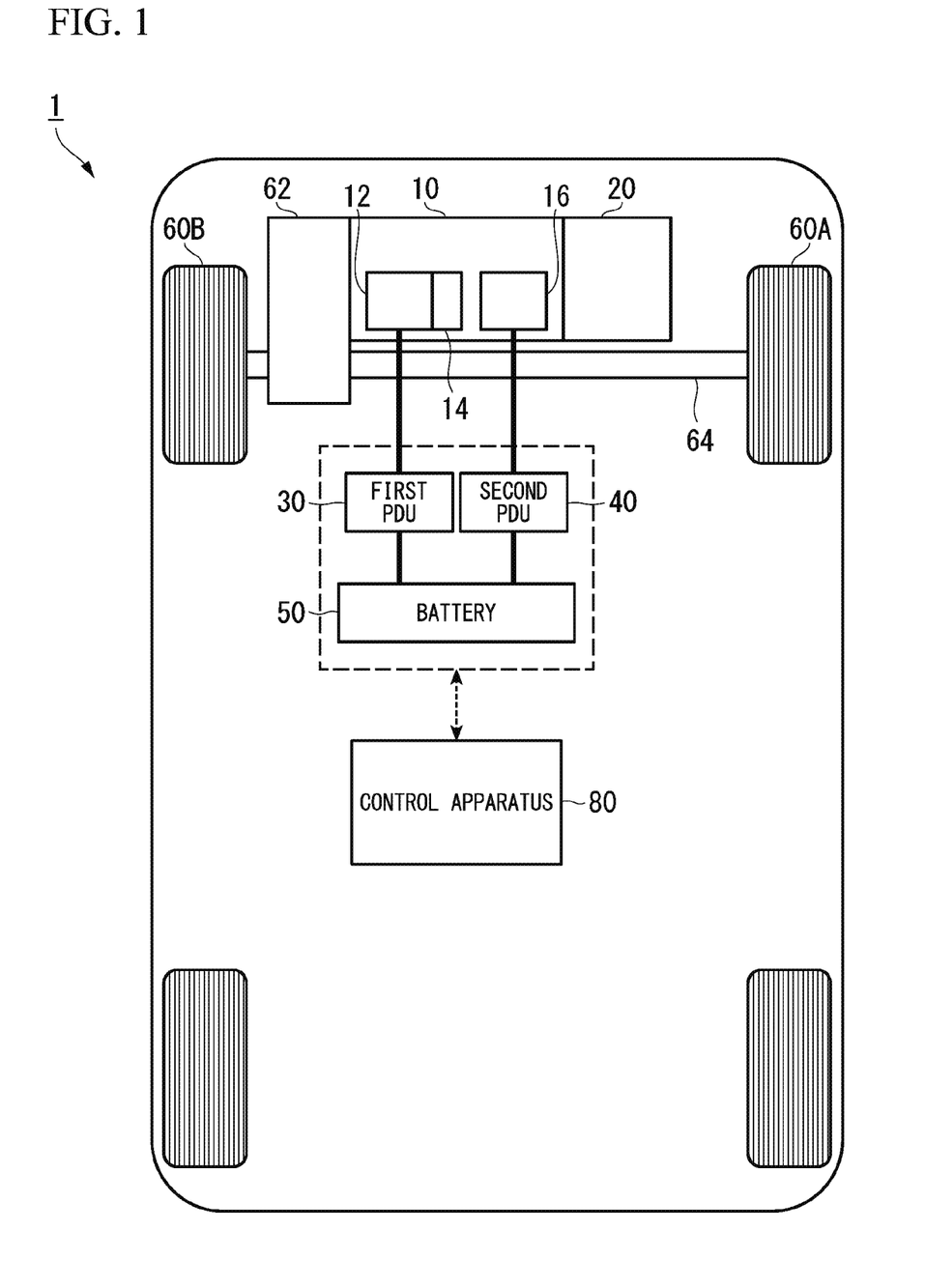
FIG. 1 is a view showing an example of a vehicle according to a first embodiment.

FIG. 1 is a view showing an example of a vehicle according to a first embodiment. As shown in FIG. 1, the vehicle 1 includes, for example, an electric motor generator 10, an engine 20, a first PDU (Power Drive Unit) 30, a second PDU 40, a battery 50, a drive wheel 60A, a drive wheel 60B, a transmission 62, an axle 64, and a control apparatus 80.

The electric motor generator 10 includes an electric motor 12, a sensor 14, and a generator 16.

The electric motor 12 is a power source of the vehicle 1. The electric motor 12 is driven, for example, by an AC current supplied from at least one of the first PDU 30 and the generator 16. The first PDU 30 converts DC electric power supplied from the battery 50 into an AC current using an inverter 38 and supplies the AC current to the electric motor 12. A power generated by the electric motor 12 is transmitted to the axle 64 via the transmission 62. The electric motor 12 functions as a regeneration generator when the vehicle 1 is braked. In this case, the electric motor 12 outputs electric power generated by the function to the battery 50 via the first PDU 30.

The sensor 14 detects, for example, a drive torque and a rotation number of the electric motor 12 and generates torque data indicating the drive torque and rotation number data indicating the rotation number.

The generator 16 generates electric power by rotating in response to a power generated by the engine 20. The electric power generated by the generator 16 is supplied to the battery 50 via the second PDU 40. The generator 16 may be omitted. In this case, instead of the generator 16, the electric motor 12 generates electric power and supplies the electric power to the battery 50.

The engine 20 is a power source of the vehicle 1. A power generated by the engine 20 is transmitted to the axle 64 via the transmission 62. Alternatively, the power generated by the engine 20 is transmitted to the generator 16.

Figure 2:
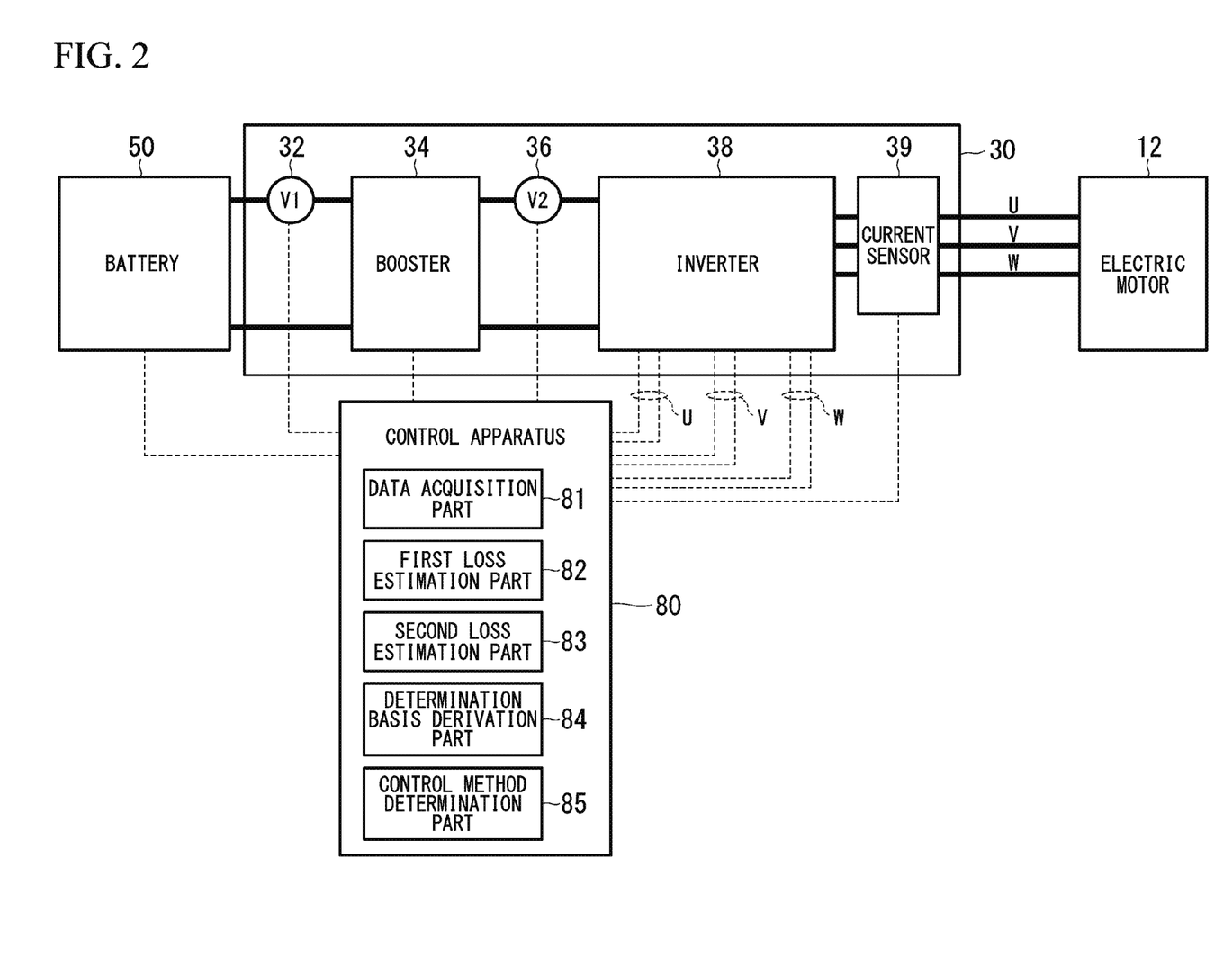
FIG. 2 is a view showing an example of a first PDU, a control apparatus, and a configuration in the vicinity thereof according to the first embodiment.

FIG. 2 is a view showing an example of the first PDU, the control apparatus, and a configuration in the vicinity thereof according to the first embodiment.

As shown in FIG. 2, the first PDU 30 includes a first voltage sensor 32, a booster 34, a second voltage sensor 36, an inverter 38, and a current sensor 39.

The first voltage sensor 32 is connected between the battery 50 and the booster 34 and detects a voltage of DC electric power input to the booster 34. The booster 34 amplifies the voltage and supplies the voltage to the inverter 38. The second voltage sensor 36 detects a DC voltage amplified by the booster 34 and generates DC voltage data indicating the DC voltage. The inverter 38 converts the DC electric power supplied from the booster 34 into AC electric power and supplies the AC electric power to the electric motor 12. The current sensor 39 detects a current of each of a U-phase, a V-phase, and a W-phase supplied to the electric motor 12 and transmits data indicating each of the three currents to the control apparatus 80.

As shown in FIG. 2, the control apparatus 80 includes a data acquisition part 81, a first loss estimation part 82, a second loss estimation part 83, a determination basis derivation part 84, and a control method determination part 85.

At least part of functions included in the control apparatus 80 is realized, for example, by a hardware processor such as a CPU (Central Processing Unit) executing a program (software). Some or all of these components may be implemented by hardware (a circuit part including circuitry) such as a LSI (Large Scale Integration), an ASIC (Application Specific Integrated Circuit), a FPGA (Field-Programmable Gate Array), or a GPU (Graphics Processing Unit) or may be implemented by cooperation between software and hardware.

The data acquisition part 81 acquires torque data, rotation number data, and DC voltage data from the sensor 14 and acquires DC voltage data from the second voltage sensor 36.

The first loss estimation part 82 estimates a first loss which is a sum of all of a loss caused by the inverter 38 and a loss caused by the electric motor 12 in a case where a one-pulse control is employed as a control method of the inverter 38. The second loss estimation part 83 estimates a second loss which is a sum of all of a loss caused by the inverter 38 and a loss caused by the electric motor 12 in a case where a pulse-width modulation (PWM: Pulse Width Modulation) control is employed as a control method of the inverter 38.

The loss caused by the inverter 38 is, for example, a heat loss caused by a current flowing when a switching element included in the inverter 38 is in a conduction state and a heat loss caused by a current flowing when the switching elements are switched to a conduction state or a non-conduction state. The loss caused by the electric motor 12 is, for example, a heat loss caused by an electric resistance of a winding, an iron loss caused by a stator and a rotor, a wind loss caused by a friction between the rotor and air inside the electric motor 12 or the like, and a mechanical loss caused by a bearing included in the electric motor 12.

The pulse-width modulation control described above is, for example, a sinusoidal pulse-width modulation control and an overmodulation pulse-width modulation control. All of the sinusoidal pulse-width modulation control, the overmodulation pulse-width modulation control, and the one-pulse control are a control that switches between a conduction state and a non-conduction state of the switching element included in the inverter 38.

Figure 3:
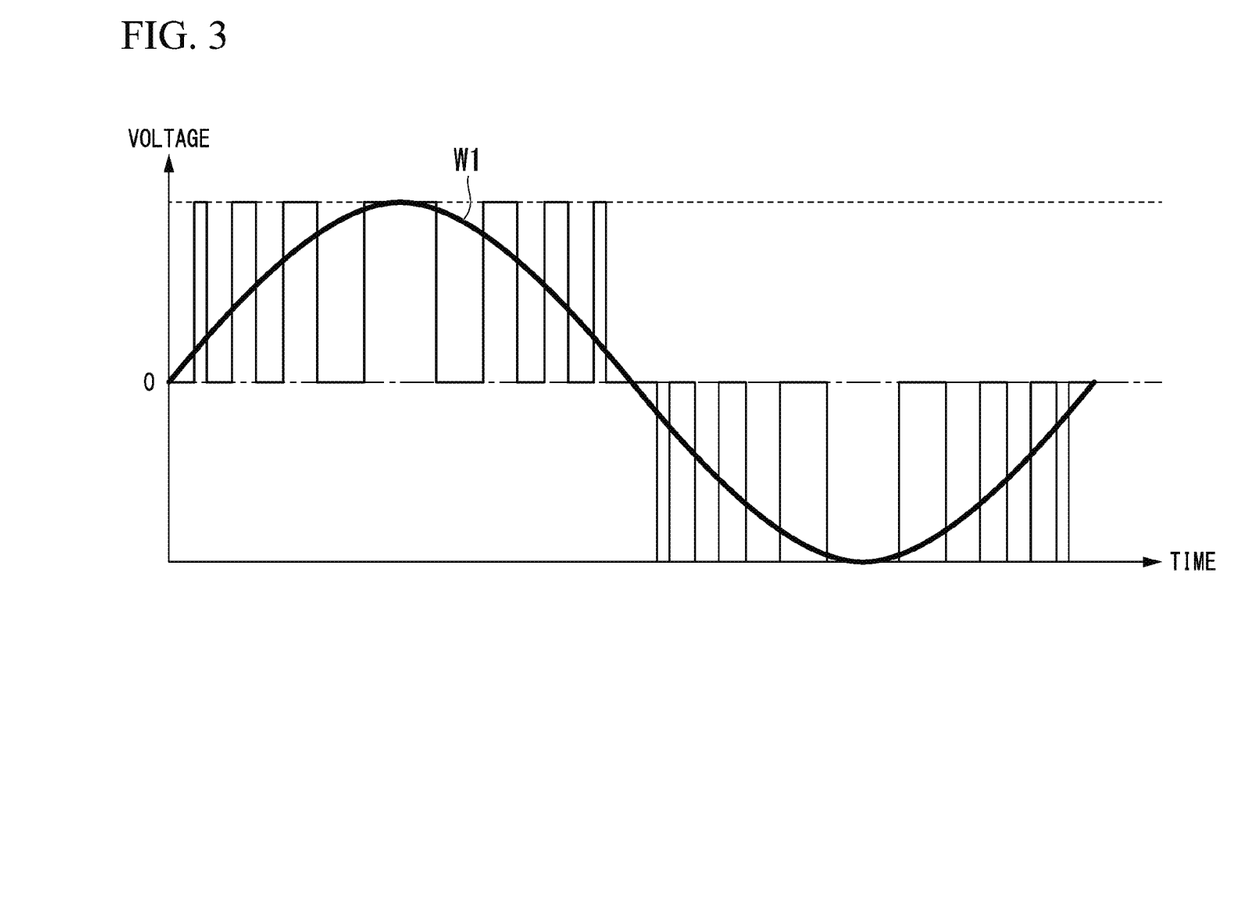
FIG. 3 is a view showing an example of a waveform of a voltage output by an inverter according to the first embodiment when a sinusoidal pulse-width modulation control is performed.

FIG. 3 is a view showing an example of a waveform of a voltage that is output by the inverter according to the first embodiment in a case where the sinusoidal pulse-width modulation control is performed. In FIG. 3, a vertical axis represents a voltage, and a horizontal axis represents a time. The sinusoidal pulse-width modulation control is a control method that supplies an AC voltage equivalent to an AC voltage represented by a sinusoidal wave W1 shown in FIG. 3 to the electric motor 12 by adjusting a duty ratio of a voltage pulse. The sinusoidal pulse-width modulation control maintains a linearity between a voltage and a pulse-width modulation control signal by performing a pulse-width modulation in a state where an amplitude of the AC voltage represented by the sinusoidal wave W1 is equal to or less than an amplitude of a voltage applied between lines of the electric motor 12. Since the sinusoidal pulse-width modulation control is a control that maintains the linearity, the number of times of performing a switching that switches between the conduction state and the non-conduction state of the switching element included in the inverter 38 of the sinusoidal pulse-width modulation control is larger than that of the overmodulation pulse-width modulation control and the one-pulse control.

Figure 4:
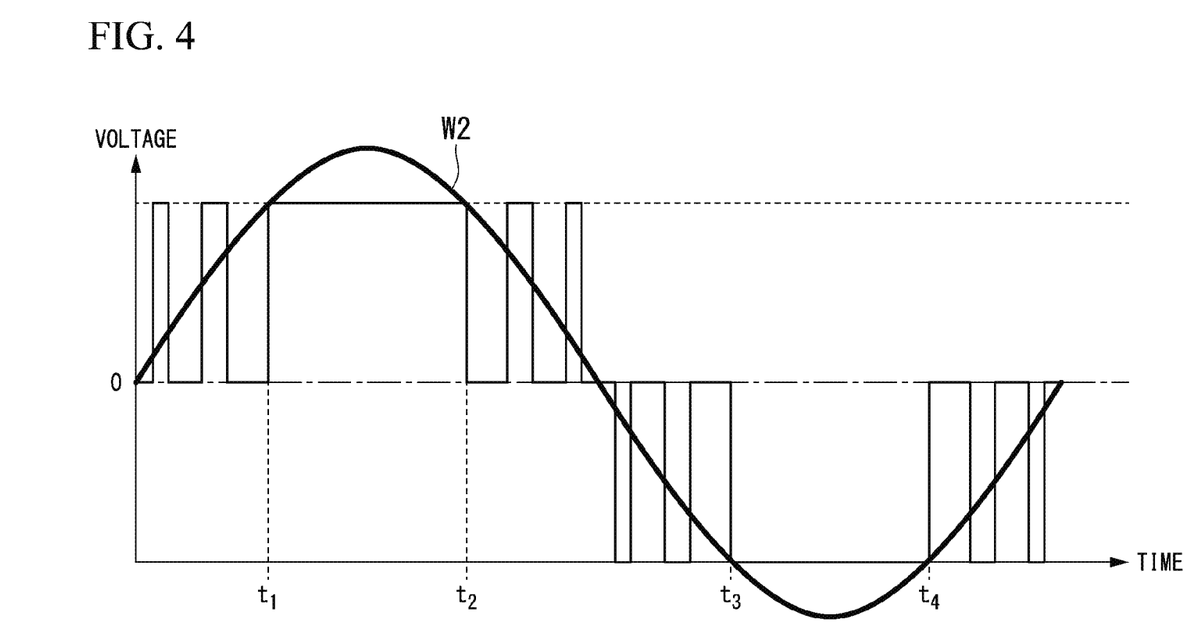
FIG. 4 is a view showing an example of a waveform of a voltage output by the inverter according to the first embodiment when an overmodulation pulse-width modulation control is performed.

FIG. 4 is a view showing an example of a waveform of a voltage that is output by the inverter according to the first embodiment in a case where the overmodulation pulse-width modulation control is performed. In FIG. 4, a vertical axis represents a voltage, and a horizontal axis represents a time. The overmodulation pulse-width modulation control is a control method that permits a non-linearity between a voltage and a pulse-width modulation signal by performing a pulse-width modulation in a state where an amplitude of an AC voltage represented by a sinusoidal wave W2 shown in FIG. 4 is larger than an amplitude of a voltage applied between lines of the electric motor 12. Thereby, the overmodulation pulse-width modulation control distorts a line voltage of the electric motor 12 which is a pseudo sinusoidal wave so as to approach a rectangular waveform and makes it possible to increase a voltage utilization ratio compared to a case in which the line voltage is a pseudo sinusoidal wave.

As shown in FIG. 4, an absolute value of a voltage represented by the sinusoidal wave W2 is larger than an absolute value of an actually applied voltage in a non-linear period from a time $t_1$ to a time $t_2$ and a non-linear period from a time $t_3$ to a time $t_4$. That is, in the two non-linear periods, the line voltage of the electric motor 12 approaches to a rectangular waveform from a sinusoidal waveform, and the voltage utilization ratio is increased. Further, since the overmodulation pulse-width modulation control is a control that does not maintain the linearity between the voltage and the pulse-width modulation control signal, the number of times of performing the switching of the overmodulation pulse-width modulation control is less than that of the sinusoidal pulse-width modulation control.

Figure 5:
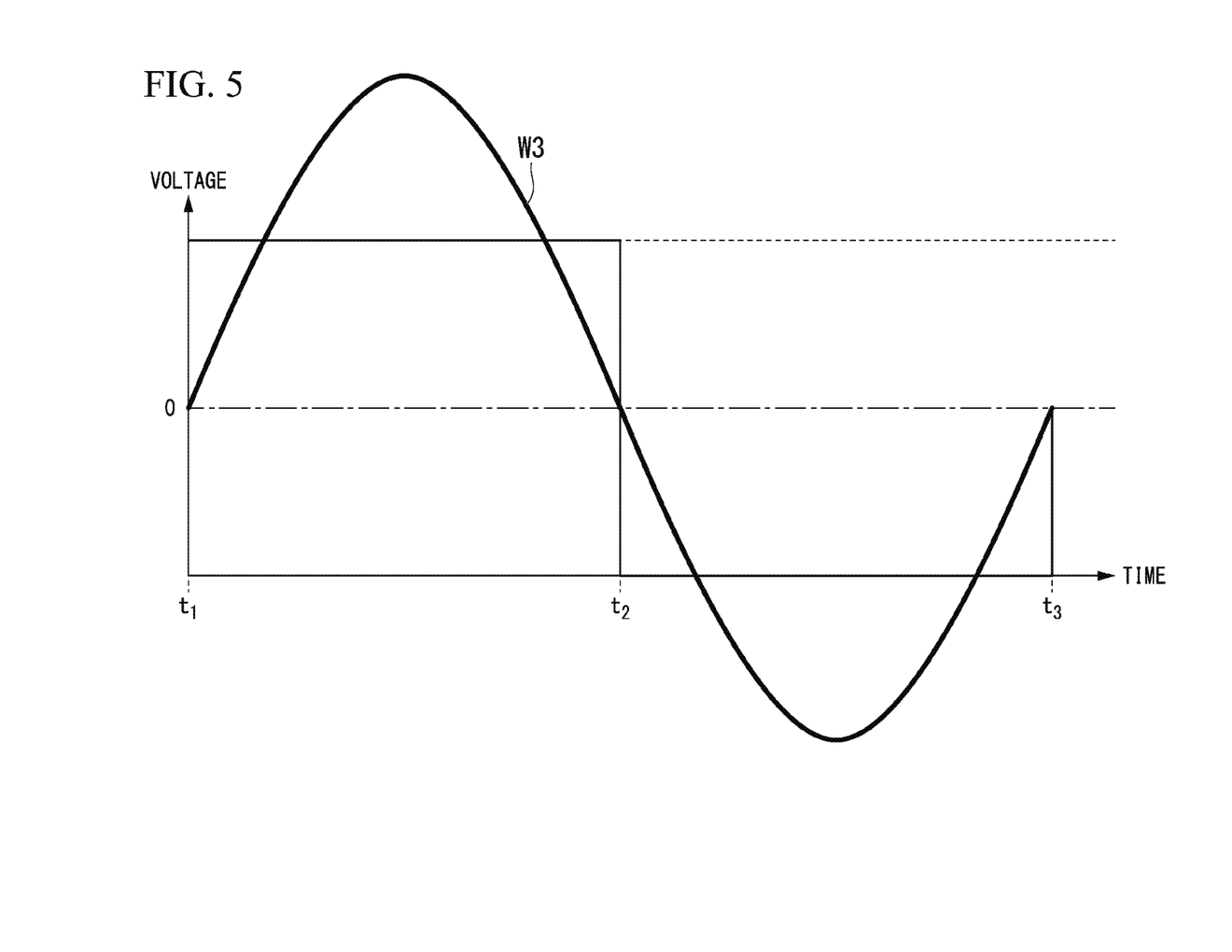
FIG. 5 is a view showing an example of a waveform of a voltage output by the inverter according to the first embodiment when a one-pulse control is performed.

FIG. 5 is a view showing an example of a waveform of a voltage that is output by the inverter according to the first embodiment in a case where a one-pulse control is performed. In FIG. 5, a vertical axis represents a voltage, and a horizontal axis represents a time. The one-pulse control performs switching twice for each cycle. For example, as shown in FIG. 5, switching is performed at two time points which are a time $t_1$ and a time $t_2$ in a period from the time $t_1$ to a time $t_3$ that is equal to the cycle of a sinusoidal wave W3. When comparing FIG. 4 and FIG. 5, it is known that the one-pulse control makes it possible to further increase the voltage utilization ratio than the overmodulation pulse-width modulation control. Further, the one-pulse control has a smaller number of times of performing switching than the overmodulation pulse-width modulation control.

Figure 6:
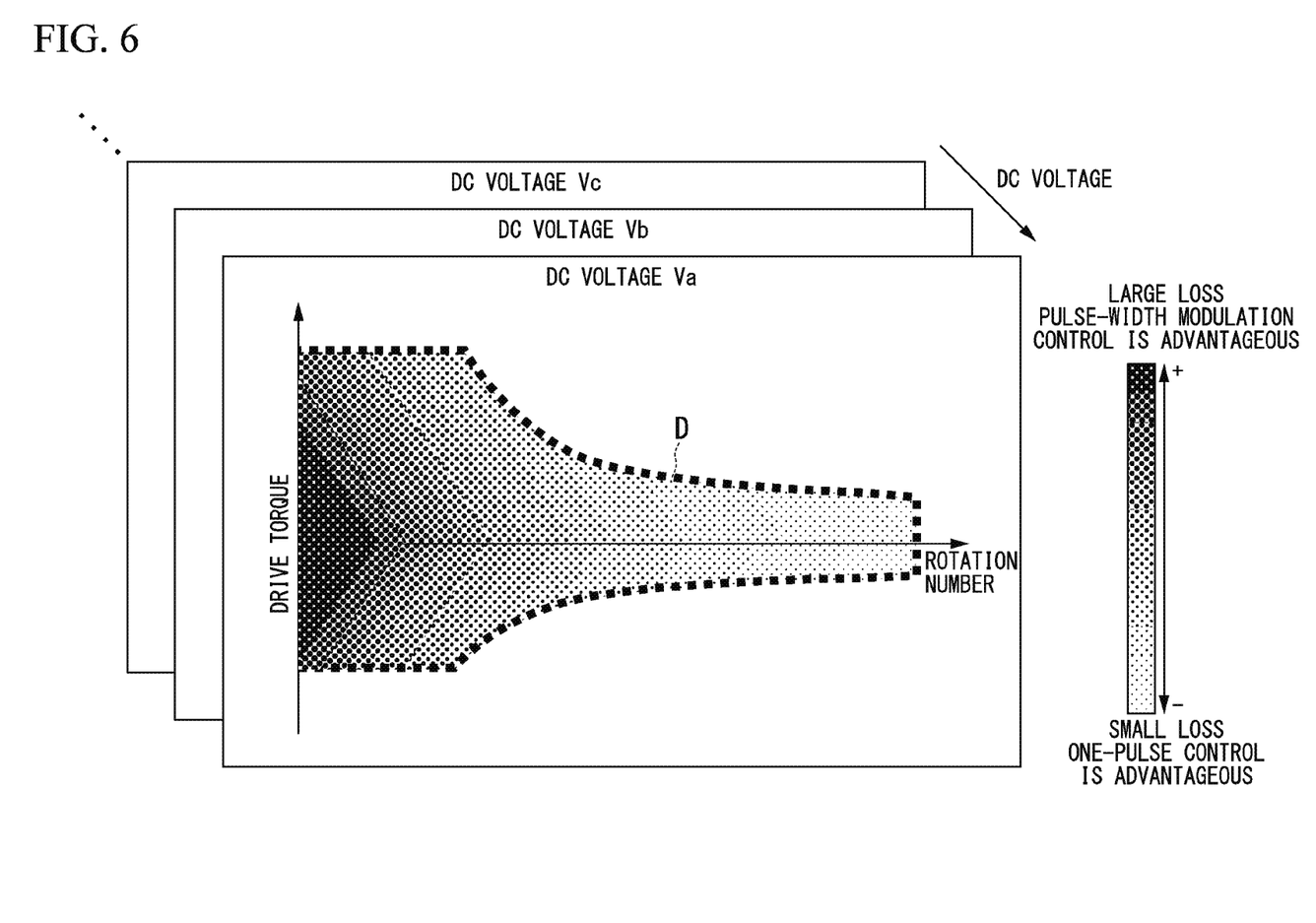
FIG. 6 is a view showing an example of a relationship among a drive torque of an electric motor, a rotation number of the electric motor, a DC voltage supplied to the inverter, and a first loss in a case where the one-pulse control is employed as a control method of the inverter according to the first embodiment.

FIG. 6 is a view showing an example of a relationship among a drive torque of an electric motor, a rotation number of the electric motor, a DC voltage supplied to the inverter, and a first loss in a case where the one-pulse control is employed as a control method of the inverter according to the first embodiment. FIG. 6 shows the first loss estimated by the first loss estimation part 82 when the vertical axis is the drive torque and the horizontal axis is the rotation number in each of a DC voltage Va, a DC voltage Vb, a DC voltage Vc, and the like supplied to the inverter 38.

A region in which the dot hatching shown in FIG. 6 is thicker presents a larger first loss, and a region in which the dot hatching shown in FIG. 6 is thinner presents a smaller first loss. Accordingly, it is known that in the example shown in FIG. 6, regardless of the drive torque, it is advantageous to employ the pulse-width modulation control as the rotation number is smaller, and it is advantageous to employ the one-pulse control as the rotation number is larger.

A dot-line D shown in FIG. 6 represents a range in which the drive torque and the rotation number are limited by a limit of an output of the electric motor 12. The first loss corresponding to each point of FIG. 6 may be calculated in advance or may be calculated each time when the first loss estimation part 82 performs a process of estimating the first loss.

Figure 7:
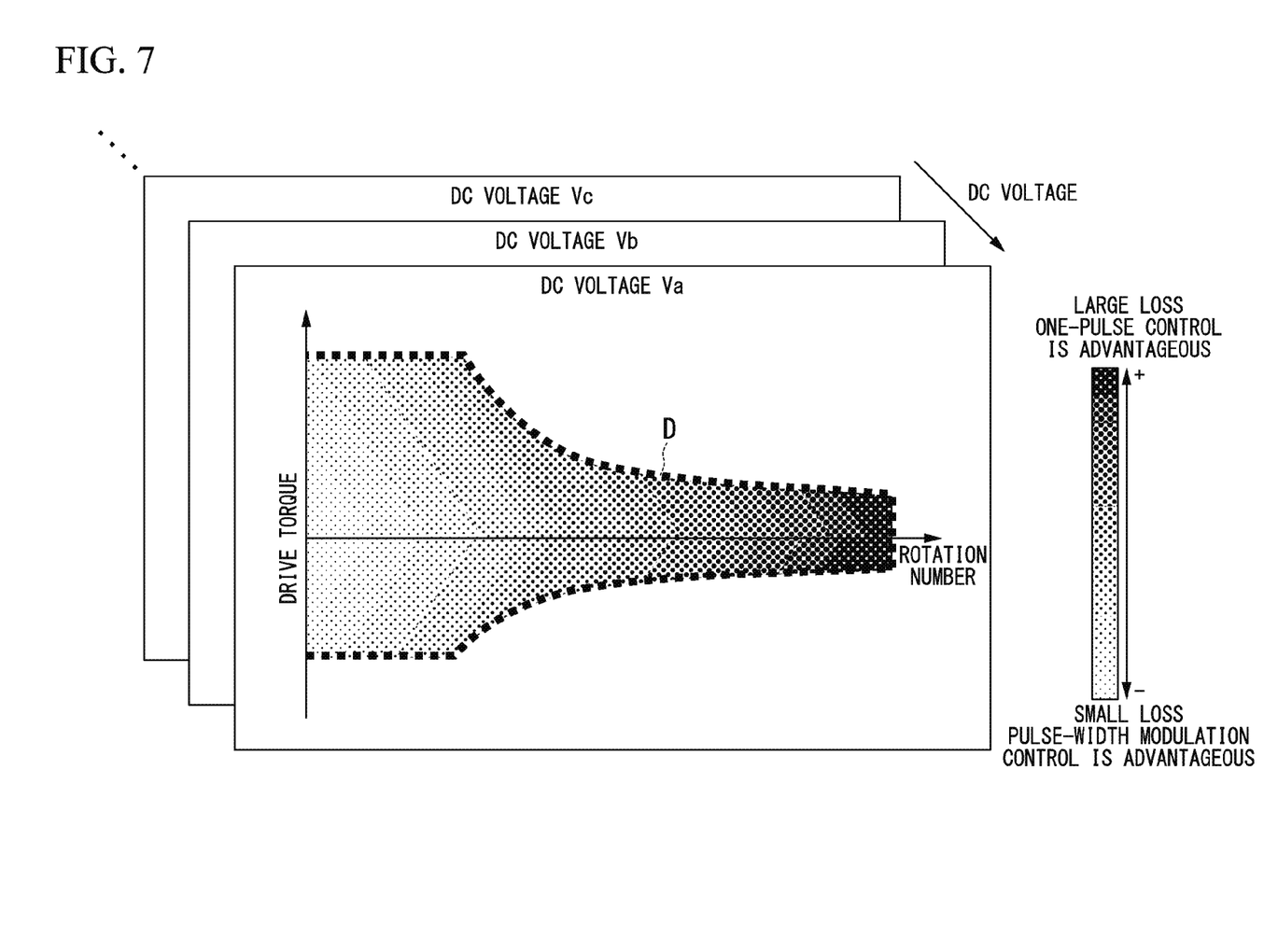
FIG. 7 is a view showing an example of a relationship among a drive torque of an electric motor, a rotation number of the electric motor, a DC voltage supplied to the inverter, and a second loss in a case where the pulse-width modulation control is employed as a control method of the inverter according to the first embodiment.

FIG. 7 is a view showing an example of a relationship among a drive torque of an electric motor, a rotation number of the electric motor, a DC voltage supplied to the inverter, and a second loss in a case where the pulse-width modulation control is employed as a control method of the inverter according to the first embodiment. FIG. 7 shows the second loss estimated by the second loss estimation part 83 when the vertical axis is the drive torque and the horizontal axis is the rotation number in each of a DC voltage Va, a DC voltage Vb, a DC voltage Vc, and the like supplied to the inverter 38.

A region in which the dot hatching shown in FIG. 7 is thicker presents a larger second loss, and a region in which the dot hatching shown in FIG. 7 is thinner presents a smaller second loss. Accordingly, it is known that in the example shown in FIG. 7, regardless of the drive torque, it is advantageous to employ the pulse-width modulation control as the rotation number is smaller, and it is advantageous to employ the one-pulse control as the rotation number is larger.

A dot-line D shown in FIG. 7 represents a range in which the drive torque and the rotation number are limited by a limit of an output of the electric motor 12. The second loss corresponding to each point of FIG. 7 may be calculated in advance or may be calculated each time when the second loss estimation part 83 performs a process of estimating the second loss.

The first loss estimation part 82 and the second loss estimation part 83 may not estimate a sum of losses of all of the items described above. That is, the first loss estimation part 82 may estimate a sum of part of the items described above as the first loss in a case where the one-pulse control is employed as the control method of the inverter 38. Similarly, the second loss estimation part 83 may estimate a sum of part of the items described above as the second loss in a case where the one-pulse control is employed as the control method of the inverter 38.

The items included in the first loss can preferably match the items included in the second loss.

The determination basis derivation part 84 derives a determination basis based on a drive efficiency of the electric motor 12 by using the torque data, the rotation number data, and the DC voltage data. For example, the determination basis derivation part 84 derives a determination basis indicating that the one-pulse control is preferable as the control method of the inverter 38 in a case where the first loss estimated by the first loss estimation part 82 is smaller than the second loss estimated by the second loss estimation part 83. Alternatively, the determination basis derivation part 84 derives a determination basis indicating that the pulse-width modulation control is preferable as the control method of the inverter 38 in a case where the second loss estimated by the second loss estimation part 83 is smaller than the first loss estimated by the first loss estimation part 82. The determination basis derivation part 84 may derive a determination basis that combines the two determination bases.

The control method determination part 85 determines, based on the determination basis, which one of the one-pulse control and the pulse-width modulation control is employed as the control method of the inverter 38.

Figure 8:
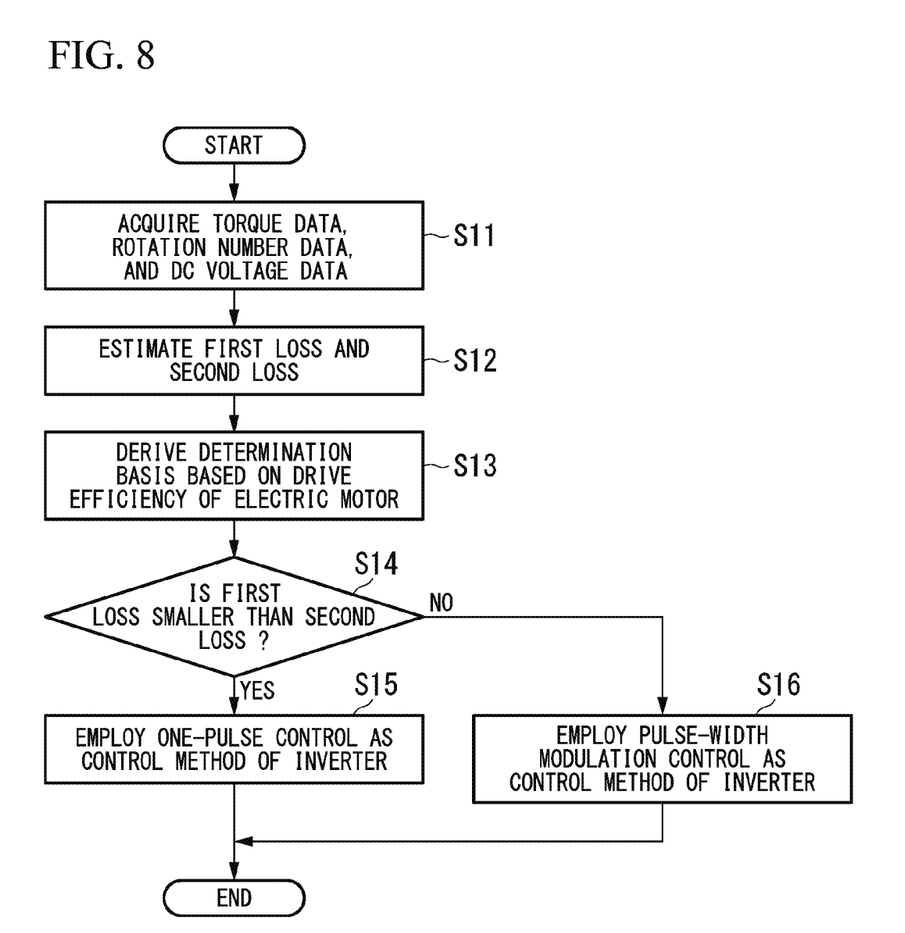
FIG. 8 is a flowchart showing an example of a process performed by the control apparatus according to the first embodiment.

Next, a process performed by the control apparatus 80 according to the first embodiment is described with reference to FIG. 8. FIG. 8 is a flowchart showing an example of the process performed by the control apparatus according to the first embodiment. The control apparatus 80 performs the process shown in FIG. 8 at an arbitrary timing.

In Step S11, the data acquisition part 81 acquires torque data, rotation number data, and DC voltage data.

In Step S12, the first loss estimation part 82 estimates a first loss. In Step S12, the second loss estimation part 83 estimates a second loss.

In Step S13, the determination basis derivation part 84 derives a determination basis based on a drive efficiency of the electric motor 12.

In Step S14, the control method determination part 85 determines whether or not the first loss is smaller than the second loss. When it is determined that the first loss is smaller than the second loss (Step S14: YES), the control method determination part 85 advances the process to Step S15. On the other hand, when it is determined that the first loss is larger than the second loss (Step S14: NO), the control method determination part 85 advances the process to Step S16. When the first loss is equal to the second loss, the process may be advanced to Step S15, or the process may be advanced to Step S16.

In Step S15, the control method determination part 85 employs the one-pulse control as the control method of the inverter 38 and terminates the process.

In Step S16, the control method determination part 85 employs the pulse-width modulation control as the control method of the inverter 38 and terminates the process.

Hereinbefore, the control apparatus according to the first embodiment is described. The control apparatus 80 determines which one of the one-pulse control and the pulse-width modulation control is employed on the basis of the determination basis based on the drive efficiency of the electric motor 12, which is derived by using the torque data, the rotation number data, and the DC voltage data. Thereby, the control apparatus 80 is able to determine that a control method having a higher drive efficiency of the electric motor 12 is employed and thereby improve an electric power cost of the vehicle 1.

Further, the control apparatus 80 derives a determination basis indicating that the one-pulse control is preferable as the control method of the inverter 38 in a case where the first loss is smaller than the second loss. Thereby, the control apparatus 80 is able to confirm that the loss in a case where the one-pulse control is employed is smaller than the loss in a case where the pulse-width modulation control is employed, then employ the one-pulse control, and improve an electric power cost of the vehicle 1.

Further, the control apparatus 80 derives a determination basis indicating that the pulse-width modulation control is preferable as the control method of the inverter 38 in a case where the second loss is smaller than the first loss. Thereby, the control apparatus 80 is able to confirm that the loss in a case where the pulse-width modulation control is employed is smaller than the loss in a case where the one-pulse control is employed, then employ the pulse-width modulation control, and improve an electric power cost of the vehicle 1.

Second Embodiment

Hereinafter, a second embodiment is described. In the description of the second embodiment, explanations regarding matters overlapping with the first embodiment may be omitted, and the same reference numeral as the first embodiment is used for a constituent element or the like similar to the first embodiment. The control apparatus according to the second embodiment does not include the first loss estimation part 82 and the second loss estimation part 83 shown in FIG. 2 and includes the data acquisition part 81, the determination basis derivation part 84, and the control method determination part 85 shown in FIG. 2. In the second embodiment, each of the determination basis derivation part 84 and the control method determination part 85 operates as described below.

For example, the determination basis derivation part 84 derives, as the determination basis, a one-pulse control lower limit rotation number which is a function of the DC voltage and the drive torque and which is a lower limit of the rotation number of the electric motor 12 in a case where the one-pulse control is capable of being employed as the control method of the inverter 38.

In this case, the control method determination part 85 determines that the one-pulse control is employed as the control method of the inverter 38 in a case where the rotation number indicated by the rotation number data is equal to or more than the one-pulse control lower limit rotation number. Further, the control method determination part 85 determines that the pulse-width modulation control is employed as the control method of the inverter 38 in a case where the rotation number indicated by the rotation number data is less than the one-pulse control lower limit rotation number.

Figure 9:
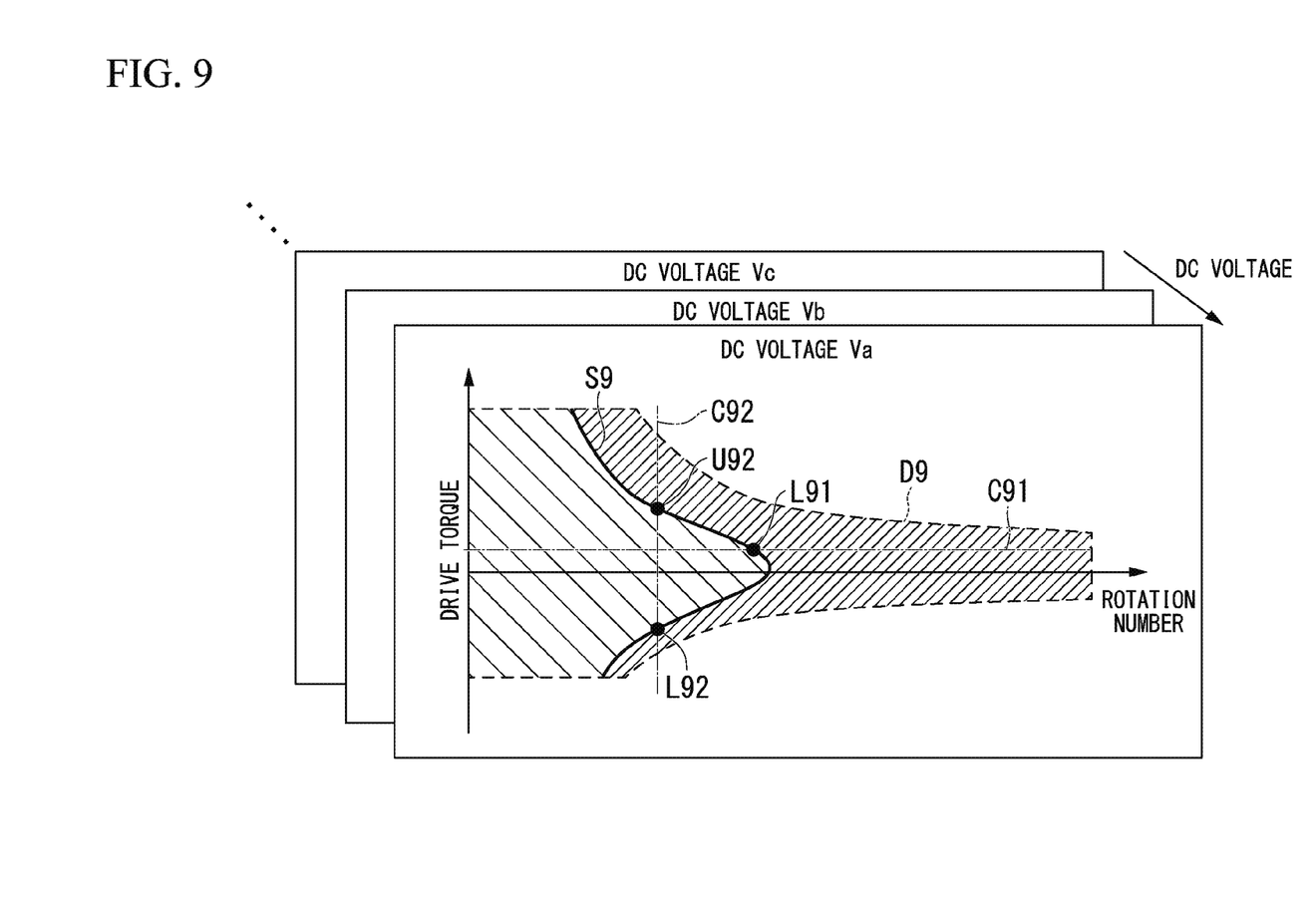
FIG. 9 is a view showing an example of a one-pulse control lower limit rotation number, a pulse-width modulation control upper limit torque, and a pulse-width modulation control lower limit torque derived by the control apparatus according to a second embodiment.

FIG. 9 is a view showing an example of a one-pulse control lower limit rotation number, a pulse-width modulation control upper limit torque, and a pulse-width modulation control lower limit torque derived by the control apparatus according to the second embodiment.

FIG. 9 shows the one-pulse control lower limit rotation number, the pulse-width modulation control upper limit torque, and the pulse-width modulation control lower limit torque when the vertical axis is the drive torque and the horizontal axis is the rotation number in each of a DC voltage Va, a DC voltage Vb, a DC voltage Vc, and the like supplied to the inverter 38.

For example, in a case where a DC voltage indicated by the DC voltage data is the DC voltage Va, a boundary between a region where it is advantageous to employ the pulse width modulation control and a region where it is advantageous to employ the one-pulse control is a curve S9. Further, even if the DC voltage indicated by the DC voltage data is a DC voltage other than the DC voltage Va, there is a curve that is the same type as the curve S9.

The control method determination part 85 determines that the pulse width modulation control is employed, for example, in a case where the drive torque indicated by the torque data is a drive torque represented by a point on a straight line C91 shown in FIG. 9, and the rotation number indicated by the rotation number data is positioned in a region having a smaller rotation number than a point L91. On the other hand, the control method determination part 85 determines that the one-pulse control is employed, for example, in a case where the drive torque indicated by the torque data is a drive torque represented by a point on the straight line C91 shown in FIG. 9, and the rotation number indicated by the rotation number data matches the point L91 or is positioned in a region having a larger rotation number than the point L91. The point L91 is an intersection point between the curve S9 and the straight line C91 and represents the one-pulse control lower limit rotation number described above.

Figure 10:
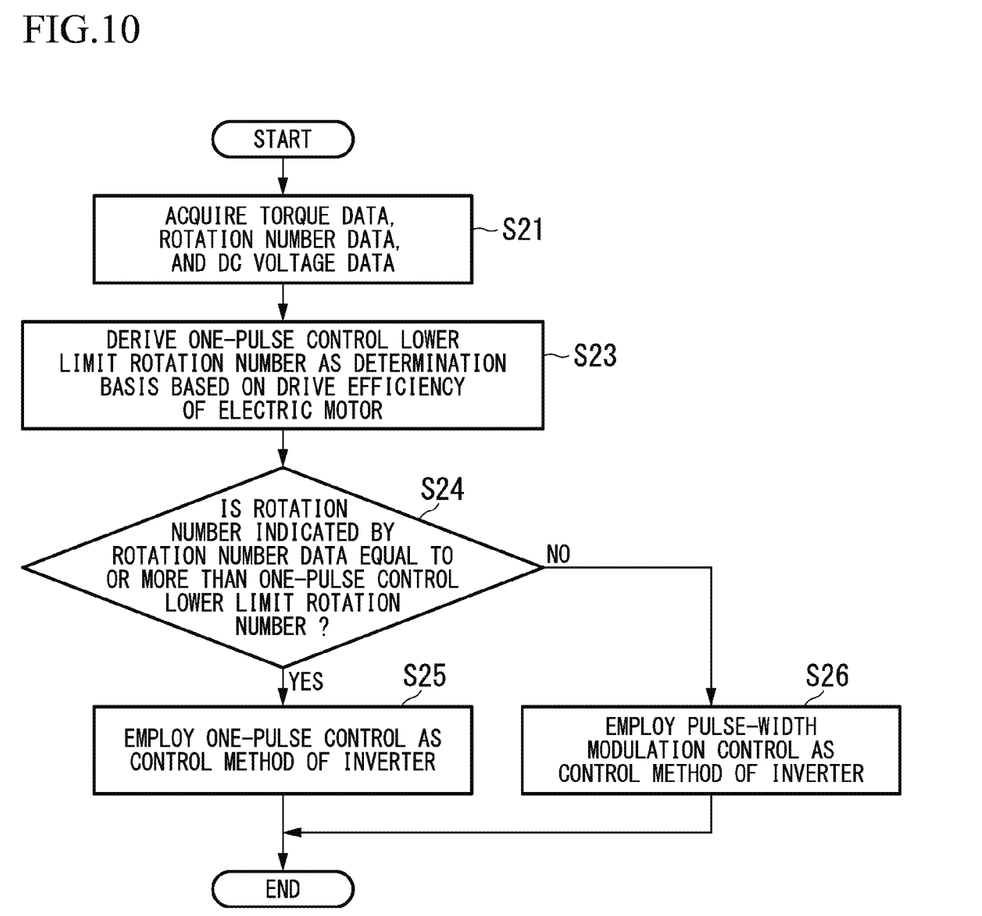
FIG. 10 is a flowchart showing an example of a process performed by the control apparatus according to the second embodiment.

Next, a process performed by the control apparatus 80 according to the second embodiment is described with reference to FIG. 10. FIG. 10 is a flowchart showing an example of the process performed by the control apparatus according to the first embodiment. The control apparatus 80 performs the process shown in FIG. 10 at an arbitrary timing.

In Step S21, the data acquisition part 81 acquires torque data, rotation number data, and DC voltage data.

In Step S23, the determination basis derivation part 84 derives a determination basis based on a drive efficiency of the electric motor 12.

In Step S24, the control method determination part 85 determines whether or not the rotation number indicated by the rotation number data is equal to or more than the one-pulse control lower limit rotation number. When it is determined that the rotation number indicated by the rotation number data is equal to or more than the one-pulse control lower limit rotation number (Step S24: YES), the control method determination part 85 advances the process to Step S25. On the other hand, when it is determined that the rotation number indicated by the rotation number data is less than the one-pulse control lower limit rotation number (Step S24: NO), the control method determination part 85 advances the process to Step S26.

In Step S25, the control method determination part 85 employs the one-pulse control as the control method of the inverter 38 and terminates the process.

In Step S26, the control method determination part 85 employs the pulse-width modulation control as the control method of the inverter 38 and terminates the process.

Hereinbefore, the control apparatus according to the second embodiment is described. The control apparatus 80 determines which one of the one-pulse control and the pulse-width modulation control is employed on the basis of the determination basis based on the drive efficiency of the electric motor 12, which is derived by using the torque data, the rotation number data, and the DC voltage data. Thereby, the control apparatus 80 is able to determine that a control method having a higher drive efficiency of the electric motor 12 is employed and thereby improve an electric power cost of the vehicle 1.

Further, the control apparatus 80 determines that the one-pulse control is employed in a case where the rotation number indicated by the rotation number data is equal to or more than the one-pulse control lower limit rotation number. Thereby, the control apparatus 80 is able to employ the one-pulse control in accordance with the rotation number of the electric motor 12 and improve an electric power cost of the vehicle 1 without performing a process of comparing a magnitude relationship between the first loss in a case where the one-pulse control is employed and the second loss in a case where the pulse-width modulation control is employed.

Further, the control apparatus 80 determines that the pulse-width modulation control is employed in a case where the rotation number indicated by the rotation number data is less than the one-pulse control lower limit rotation number. Thereby, the control apparatus 80 is able to employ the pulse-width modulation control in accordance with the rotation number of the electric motor 12 and improve an electric power cost of the vehicle 1 without performing a process of comparing a magnitude relationship between the first loss in a case where the one-pulse control is employed and the second loss in a case where the pulse-width modulation control is employed.

The second embodiment is described using an example in which the determination basis derivation part 84 derives the one-pulse control lower limit rotation number as the determination basis; however, the embodiment is not limited thereto.

For example, the determination basis derivation part 84 derives, as the determination basis, a pulse-width modulation control upper limit torque and a pulse-width modulation control lower limit torque which are a function of the motor rotation number and the DC voltage and which are an upper limit and a lower limit of the drive torque of the electric motor 12, respectively, in a case where the pulse-width modulation control is capable of being employed as the control method of the inverter 38.

Then, the control method determination part 85 determines that the one-pulse control is employed as the control method of the inverter 38 in a case where the drive torque indicated by the torque data is less than the pulse-width modulation control lower limit torque or in a case where the drive torque indicated by the torque data exceeds the pulse-width modulation control upper limit torque. Further, the control method determination part 85 determines that the pulse-width modulation control is employed as the control method of the inverter 38 in a case where the drive torque indicated by the torque data is equal to or more than the pulse-width modulation control lower limit torque and is equal to or less than the pulse-width modulation control upper limit torque.

The control method determination part 85 determines that the pulse-width modulation control is employed, for example, in a case where the rotation number indicated by the rotation number data is a rotation number represented by a point on a straight line C92 shown in FIG. 9, and the drive torque indicated by the torque data is represented by a point positioned on a line segment that connects a point U92 and a point L92, on the point U92, or on the point L92. On the other hand, the control method determination part 85 determines that the one-pulse control is employed, for example, in a case where the rotation number indicated by the rotation number data is a rotation number represented by a point on the straight line C92 shown in FIG. 9, and the drive torque indicated by the torque data is represented by a point positioned on a portion of the straight line C92 excluding the line segment that connects the point U92 and the point L92, the point U92, and the point L92.

Thereby, the control apparatus 80 is able to employ the one-pulse control in accordance with the drive torque of the electric motor 12 and improve an electric power cost of the vehicle 1 without performing a process of estimating the first loss in a case where the one-pulse control is employed, a process of estimating the second loss in a case where the pulse-width modulation control is employed, and a process of comparing a magnitude relationship between the first loss and the second loss.

Although embodiments of the present invention have been described with reference to the drawings, the present invention is not limited in to the embodiments described above, and various modifications and substitutions can be made without departing from the scope of the present invention.

What is claimed is:

1. A control apparatus comprising:
   a data acquisition part configured to acquire torque data indicating a drive torque of an electric motor, rotation number data indicating a rotation number of the electric motor, and direct current (DC) voltage data indicating a DC voltage supplied to an inverter that supplies an alternating current (AC) current to the electric motor;
   a first loss estimation part configured to estimate a first loss that is a sum of at least part of a loss caused by the inverter and at least part of a loss caused by the electric motor in a case in which a one-pulse control is employed as a control method of the inverter, wherein the first loss estimation part is configured to estimate the first loss based on the torque data, the rotation number data, the DC voltage data, and first reference information indicating the first loss in the case in which the one-pulse control is employed as the control method of the inverter for each of different combinations of the torque data, the rotation number data and the DC voltage data;
   a second loss estimation part configured to estimate a second loss that is a sum of at least part of a loss caused by the inverter and at least part of a loss caused by the electric motor in a case in which a pulse-width modulation control is employed as the control method of the inverter, wherein the second loss estimation part is configured to estimate the second loss based on the torque data, the rotation number data, the DC voltage data, and second reference information indicating the second loss in the case in which the pulse-width modulation control is employed as the control method of the inverter for each of different combinations of the torque data, the rotation number data and the DC voltage data; and
   a control method determination part configured to employ the one-pulse control as the control method of the inverter in response to determining that the first loss estimated by the first loss estimation part is smaller than the second loss estimated by the second loss estimation part, and to employ the pulse-width modulation control as the control method of the inverter in response to determining that the second loss estimated by the second loss estimation part is smaller than the first loss estimated by the first loss estimation part.

2. The control apparatus according to claim 1, wherein the control method determination part is configured to employ the one-pulse control as the control method of the inverter in response to determining that the rotation number indicated by the rotation number data is equal to or greater than a one-pulse control lower limit rotation number.

3. The control apparatus according to claim 1, wherein the control method determination part is configured to employ the pulse-width modulation control as the control method of the inverter in response to determining that the rotation number indicated by the rotation number data is less than a one-pulse control lower limit rotation number.

4. The control apparatus according to claim 1, wherein the control method determination part is configured to employ the one-pulse control as the control method of the inverter in response to determining that the rotation number indicated by the rotation number data is equal to or greater than a one-pulse control lower limit rotation number, and in in response to determining that the drive torque indicated by the torque data is less than a pulse-width modulation control lower limit torque or that the drive torque indicated by the torque data exceeds a pulse-width modulation control upper limit torque.

5. The control apparatus according to claim 1, wherein the control method determination part is configured to employ the pulse-width modulation control as the control method of the inverter in response to determining that the rotation number indicated by the rotation number data is less than a one-pulse control lower limit rotation number, and in response to determining that the drive torque indicated by the torque data is equal to or greater than a pulse-width modulation control lower limit torque or that the drive torque indicated by the torque data is equal to or less than a pulse-width modulation control upper limit torque.

6. A vehicle system comprising:
   a data acquisition part configured to acquire torque data indicating a drive torque of an electric motor that is a power source of a vehicle, rotation number data indicating a rotation number of the electric motor, and direct current (DC) voltage data indicating a DC voltage supplied to an inverter that supplies an alternating current (AC) current to the electric motor;

a first loss estimation part configured to estimate a first loss that is a sum of at least part of a loss caused by the inverter and at least part of a loss caused by the electric motor in a case in which a one-pulse control is employed as a control method of the inverter, wherein the first loss estimation part is configured to estimate the first loss based on the torque data, the rotation number data, the DC voltage data, and first reference information indicating the first loss in the case in which the one-pulse control is employed as the control method of the inverter for each of different combinations of the torque data, the rotation number data and the DC voltage data;

a second loss estimation part configured to estimate a second loss that is a sum of at least part of a loss caused by the inverter and at least part of a loss caused by the electric motor in a case in which a pulse-width modulation control is employed as the control method of the inverter, wherein the second loss estimation part is configured to estimate the second loss based on the torque data, the rotation number data, the DC voltage data, and second reference information indicating the second loss in the case in which the pulse-width modulation control is employed as the control method of the inverter for each of different combinations of the torque data, the rotation number data and the DC voltage data; and a control method determination part that is configured to employ the one-pulse control as the control method of the inverter in response to determining that the first loss estimated by the first loss estimation part is smaller than the second loss estimated by the second loss estimation part, and to employ the pulse-width modulation control as the control method of the inverter in response to determining that the second loss estimated by the second loss estimation part is smaller than the first loss estimated by the first loss estimation part.

7. A control method including:

acquiring torque data indicating a drive torque of an electric motor, rotation number data indicating a rotation number of the electric motor, and direct current (DC) voltage data indicating a DC voltage supplied to an inverter which supplies an alternating current (AC) current to the electric motor;

estimating, based on the torque data, the rotation number data, the DC voltage data, and first reference information, a first loss that is a sum of at least part of a loss caused by the inverter and at least part of a loss caused by the electric motor in a case in which a one-pulse control is employed as a control method of the inverter, wherein the first reference information indicates the first loss in the case in which the one-pulse control is employed as the control method of the inverter for each of different combinations of the torque data, the rotation number data and the DC voltage data;

estimating, based on the torque data, the rotation number data, the DC voltage data, and second reference information, a second loss that is a sum of at least part of a loss caused by the inverter and at least part of a loss caused by the electric motor in a case in which a pulse-width modulation control is employed as the control method of the inverter, wherein the second reference information indicates the second loss in the case in which the pulse-width modulation control is employed as the control method of the inverter for each of different combinations of the torque data, the rotation number data and the DC voltage data;

employing the one-pulse control as the control method of the inverter in response to determining that the first loss is smaller than the second loss; and employing the pulse-width modulation control as the control method of the inverter in response to determining that the second loss is smaller than the first loss.

8. The vehicle system of claim 6, wherein the control method determination part is configured to employ the one-pulse control as the control method of the inverter in response to determining that the rotation number indicated by the rotation number data is equal to or greater than a one-pulse control lower limit rotation number.

9. The vehicle system of claim 6, wherein the control method determination part is configured to employ the pulse-width modulation control as the control method of the inverter in response to determining that the rotation number indicated by the rotation number data is less than a one-pulse control lower limit rotation number.

* * * * *